UNITED STATES PATENT OFFICE.

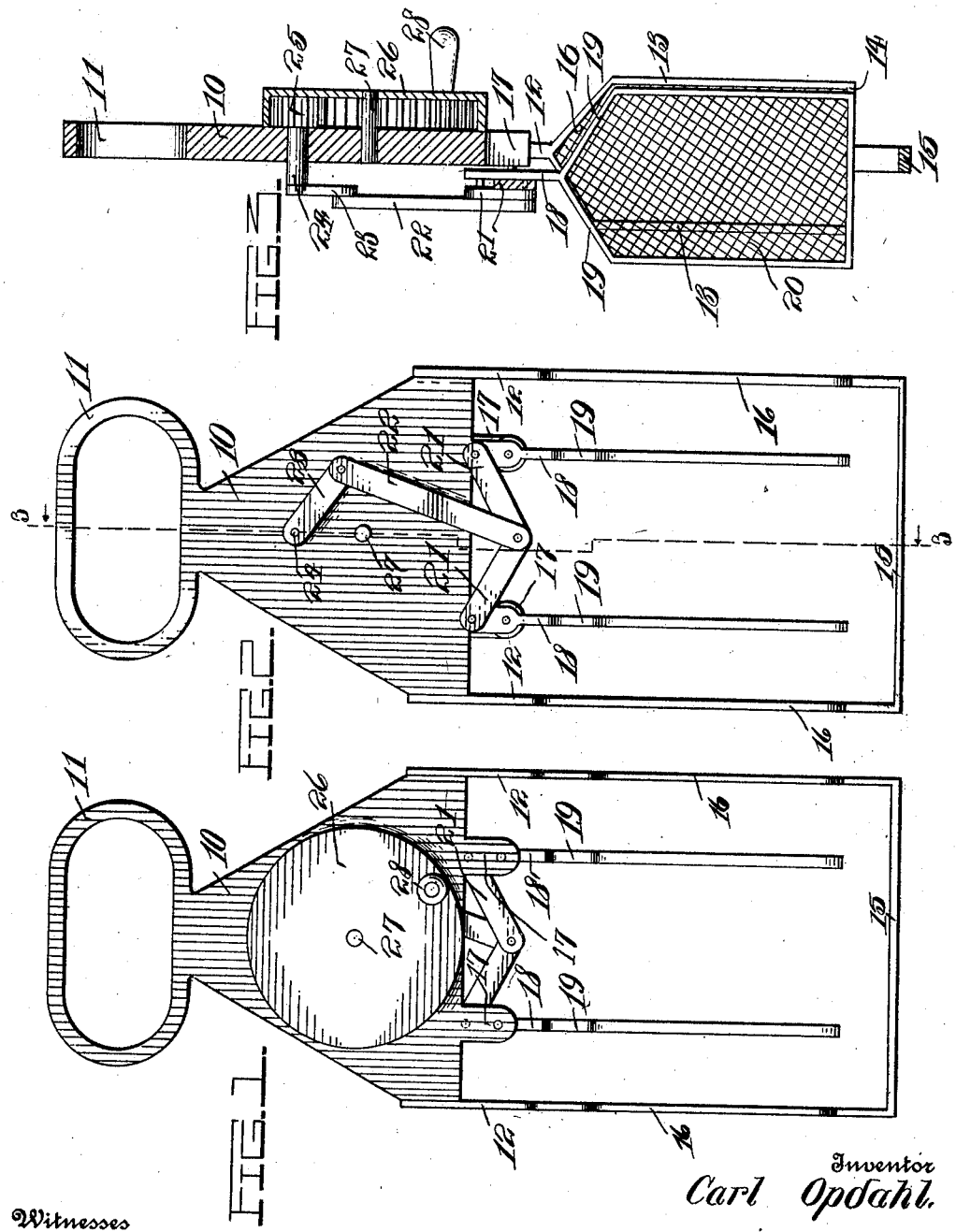

CARL OPDAHL, OF SHELDON, NORTH DAKOTA.

EGG-BEATER.

1,002,434.  Specification of Letters Patent.  Patented Sept. 5, 1911.

Application filed January 12, 1911. Serial No. 602,301.

*To all whom it may concern:*

Be it known that I, CARL OPDAHL, a citizen of the United States, residing at Sheldon, in the county of Ransom, State of North Dakota, have invented certain new and useful Improvements in Egg-Beaters; and I do hereby declare the following to be a full, clear, and exact description of the invention, such as will enable others skilled in the art to which it appertains to make and use the same.

This invention relates to churning devices more particularly to egg beaters, and has for its principal object to provide a simple device that will more thoroughly "beat" eggs than ordinary devices of this character, and to this end employs stationary reticulate or wire gauze blades between which similar blades are oscillated in unison, the eggs thus being whipped through the mesh structure of both stationary and moving blades and thus being "beaten" in less time and with less manual labor than usual.

In the accompanying drawing forming part of this specification, Figure 1 is a front elevation of the beater, Fig. 2 is a rear elevation of the beater, Fig. 3 is a longitudinal sectional view taken on the line 3—3 Fig. 2.

Referring now to the drawing in which like characters of reference designate similar parts, 10 designates a triangular plate like support, one corner of which is equipped with a hand loop 11 which forms means for holding the beater stationary and in upright position within the vessel containing the eggs to be beaten.

Fixed to both corners of the triangular support remote from the grip, are a pair of forked arms 12, the branches 13 of each arm being connected by a spacing brace strip 14, and the brace strips of both arms being connected by a cross brace 15 the opposite ends of which are fixed to approximately the central portions of the brace strips 14, this cross brace underlying and being arranged in the plane of the triangular support.

Marginally fixed to the branches of each forked arm is a reticulate or wire mesh element 16. The branched arms together with their reticulate elements form what will be hereinafter referred to as stationary blades and it is understood that the construction of these blades is not limited to the precise form herein illustrated but such changes may be made in the illustrated structure as properly fall within the scope of the appended claims.

Depending from the edge of the triangular support intermediate the branched arms, is a pair of spaced lugs 17. Pivoted centrally to each lug is a lever 18, this lever being branched at its lower end, as shown at 19, and a wire mesh element 20 is marginally secured in any preferred manner to these branches, this reticulate element and branched portion of the lever forming what will be hereinafter referred to as an oscillating blade. Both oscillating blades are arranged between the fixed blades, and for simultaneously actuating the oscillating blades, a toggle lever is terminally connected to the free ends of the levers 18, this toggle lever comprising a pair of links 21 pivotally connected together at their inner ends and pivotally connected at their outer ends to the levers 18. A pitman 22 is pivotally connected to the connected inner ends of the toggle lever links, and the free end of this pitman pivotally engages with a crank link 23, this crank link being fixed to a shaft 24 which projects transversely through the plate-like support and is equipped on its outer end with a pinion 25, this pinion meshing with an actuating gear 26 which is mounted for rotation upon a stationary pin 27 fixed to the support. A crank handle 28 is fixed to the gear wheel adjacent its rim and forms means for rotating the gear wheel.

In operation the hand is inserted through the hand loop 11, and the beater bodily inserted into the vessel containing the eggs to be whipped until the cross brace 15 rests upon the bottom of the vessel. Now the gear wheel is rotated through the instrumentality of the crank handle, this rotation of the gear wheel causing the toggle lever to be actuated through the instrumentality of the crank and pitman connection, and during actuation of the toggle lever the oscillating blade levers will be oscillated simultaneously and during the oscillation of these blades, the eggs will be whipped through the wire mesh elements of both stationary and oscillating blade and thoroughly beaten.

What is claimed, is:—

1. A beater including a support, spaced oscillating levers pivoted to said support and each terminating in an orificed blade, a driving crank and pitman on said support, and a toggle lever connection between said levers and said pitman for simultaneously actuating said levers.

2. A beater including a support, fixed orificed blades pendent in spaced relation from said support, spaced orificed blades between said fixed blades and having levers pivoted on said support, and means for oscillating said levers including a driving crank and pitman on said support, and a toggle lever connection between said pitman and said levers.

3. A beater including a support equipped with a grip, a pair of reticulate blades pendent from said support and held in spaced relation by a cross element, said cross element underlying said support and forming means for holding said support in upright position in a container, a pair of reticulate blades between said fixed blades and having integral levers pivoted upon said support, and actuating means on said support including a driving crank and pitman, and a toggle lever connection between said pitman and said blade levers operating to simultaneously oscillate said blade levers whereby the blades carried thereby are moved in unison toward and away from said fixed blades.

In testimony whereof, I affix my signature, in presence of two witnesses.

CARL OPDAHL.

Witnesses:
T. L. WIPER,
E. B. GREENE.

---

Copies of this patent may be obtained for five cents each, by addressing the "Commissioner of Patents, Washington, D. C."